United States Patent
Zhang et al.

(10) Patent No.: US 8,600,139 B2
(45) Date of Patent: Dec. 3, 2013

(54) TIME-OF-FLIGHT POSITRON EMISSION TOMOGRAPHY RECONSTRUCTION USING IMAGE CONTENT GENERATED EVENT-BY-EVENT BASED ON TIME-OF-FLIGHT INFORMATION

(75) Inventors: Bin Zhang, Richmond Heights, OH (US); Zhiqiang Hu, Twinsburg, OH (US); Chi-Hua Tung, Aurora, OH (US)

(73) Assignee: Koninklijke Philips N.V., Eindhoven (NL)

( * ) Notice: Subject to any disclaimer, the term of this patent is extended or adjusted under 35 U.S.C. 154(b) by 130 days.

(21) Appl. No.: 13/321,192

(22) PCT Filed: May 4, 2010

(86) PCT No.: PCT/IB2010/051958
§ 371 (c)(1),
(2), (4) Date: Nov. 18, 2011

(87) PCT Pub. No.: WO2010/143082
PCT Pub. Date: Dec. 16, 2010

(65) Prior Publication Data
US 2012/0070057 A1 Mar. 22, 2012

Related U.S. Application Data

(60) Provisional application No. 61/184,877, filed on Jun. 8, 2009, provisional application No. 61/225,580, filed on Jul. 15, 2009.

(51) Int. Cl.
*G06K 9/00* (2006.01)
(52) U.S. Cl.
USPC .......................................................... 382/131

(58) Field of Classification Search
None
See application file for complete search history.

(56) References Cited

U.S. PATENT DOCUMENTS

| 7,518,114 | B2 | 4/2009 | Ganin et al. | |
|---|---|---|---|---|
| 2005/0004446 | A1* | 1/2005 | Cowan et al. | 600/407 |
| 2006/0097175 | A1* | 5/2006 | Ganin et al. | 250/363.03 |
| 2007/0106154 | A1* | 5/2007 | Conti | 600/436 |

(Continued)

FOREIGN PATENT DOCUMENTS

WO 2008146186 A2 12/2008

OTHER PUBLICATIONS

John Canny, "A Computational Approach to Edge Detection", Nov. 1986, IEEE Transactions of Pattern Analysis and Machine Intelligence, Viol. PAMI-8, No. 6, pp. 679-698.*

(Continued)

*Primary Examiner* — Bhavesh Mehta
*Assistant Examiner* — Siamak Harandi

(57) ABSTRACT

A method of processing a positron emission tomography (PET) imaging data set (30) acquired of a subject includes independently localizing each positron-electron annihilation event of the PET imaging data set based on time of flight (TOF) localization of the positron-electron annihilation event to form a generated image (34). The generated image may be displayed. The generated image is suitably used as the basis for an initial image of an iterative reconstruction (40) of the PET imaging data set (30) to produce a reconstructed image (42). A spatial contour (56) of an image of the subject in the PET imaging data set (30) is suitably delineated based on the generated image (34). A subject attenuation map (62) for use in PET image reconstruction (40) is suitably constructed based in part on the spatial contour (56).

20 Claims, 5 Drawing Sheets

(56) References Cited

U.S. PATENT DOCUMENTS

Figure 1:
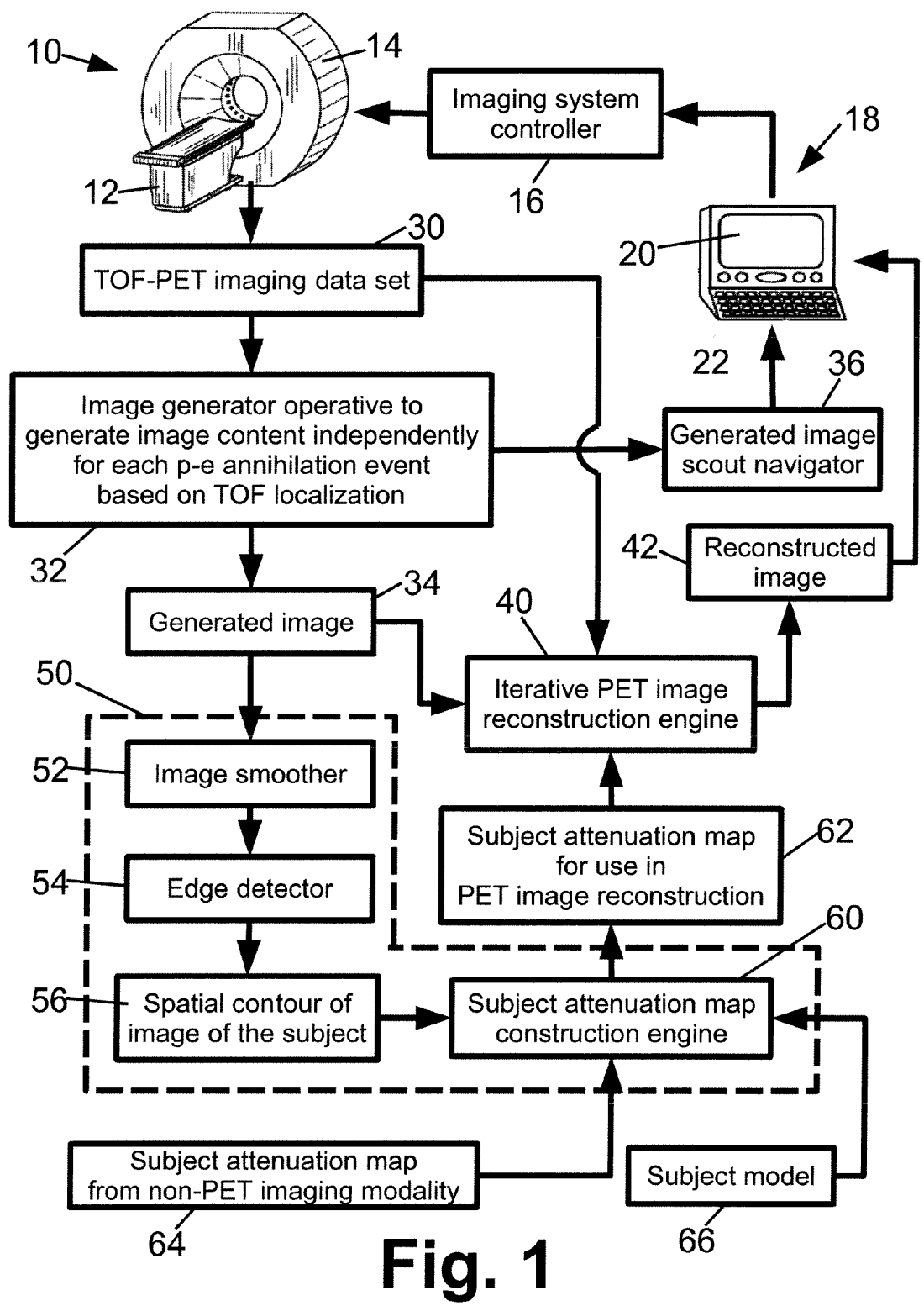

| | | | |
|---|---|---|---|
| 2008/0025459 A1* | 1/2008 | Shi et al. | 378/10 |
| 2008/0029704 A1* | 2/2008 | Hefetz et al. | 250/363.01 |
| 2008/0273780 A1* | 11/2008 | Kohlmyer et al. | 382/131 |
| 2009/0124900 A1* | 5/2009 | Vandenberghe | 600/436 |

OTHER PUBLICATIONS

Ay, M. R., et al.; Computed Tomography Based Attenuation Correction in PET/CT: Principles, Instrumentation, Protocols, Artifacts and Future Trends; 2007; Iran J. Nucl. Med.; 15(2)1-29.

Crespo, P., et al.; Direct time-of-flight for quantitative, real-time in-beam PET: a concept and feasibility study; 2007; Phys. Med. Biol.; 52:6795-6811.

Matej, S., et al.; Efficient 3-D TOF PET Reconstruction Using View-Grouped Histo-Images: DIRECT—Direct Image Reconstruction for TOF; 2009; IEEE Trans. on Medical Imaging; 28(5)739-751.

Mullani, N. A., et al.; System Design of Fast PET Scanners Utilizing Time-of-Flight; 1981; IEEE Trans. on Nuclear Sciences; 28(1)104-108.

Tang, L., et al.; Validation of mutual information-based registration of CT and bone SPECT images in dual-isotope studies; 2008; Computer Methods and Programs in Biomedicine; 92(2)173-185.

Vandenberghe, S., et al.; Rebinning and reconstruction techniques for 3D TOF-PET; 2006; Nuclear Instruments and Methods in Physics Research; A 569:421-424.

Zaidi, H., et al.; Current Trends in PET and Combined (PET/CT and MET/MR) Systems Design; 2007; Positron Emission Tomography PET CLIN 2; 2(2)109-123.

\* cited by examiner

TIME-OF-FLIGHT POSITRON EMISSION TOMOGRAPHY RECONSTRUCTION USING IMAGE CONTENT GENERATED EVENT-BY-EVENT BASED ON TIME-OF-FLIGHT INFORMATION

CROSS REFERENCE TO RELATED APPLICATIONS

This application claims the benefit of U.S. provisional application Ser. No. 61/184,877 filed Jun. 8, 2009 and U.S. provisional application Ser. No. 61/225,580 filed Jul. 15, 2009, both of which are incorporated herein by reference.

The following relates to the imaging arts, positron emission tomography (PET) imaging arts, time-of-flight (TOF) PET imaging arts, medical imaging arts, and related arts.

Positron emission tomography (PET) imaging entails administering a radiopharmaceutical including a positron-emitting radioisotope to a subject, and detecting 511 keV gamma rays generated by positron-electron annihilation events. Momentum and energy conservation causes each positron-electron annihilation event to emit two oppositely directed 511 keV gamma rays—accordingly, two substantially simultaneous 511 keV gamma ray detection events correspond to a single detected positron-electron annihilation event. Absent scattering, the detected positron-electron annihilation event lies somewhere on the straight line connecting the two 511 keV gamma ray detection events.

A PET imaging data set comprises a set of such detected electron-positron annihilation events, which can be reconstructed into an image using a suitable reconstruction algorithm. The reconstructed image represents a spatial distribution of the positron-electron annihilation events, which effectively corresponds to a spatial distribution of the radiopharmaceutical in the subject due to a short mean positron travel distance before annihilation. The radiopharmaceutical can be selected to accumulate in an organ or tissue of interest, such as the liver or brain, so as to provide a clinically useful image for medical or veterinary purposes. If the radiopharmaceutical is a substance that incorporates into a metabolic pathway, the PET image can provide functional information about the metabolic pathway. Some known PET image reconstruction algorithms include filtered backprojection and iterative backprojection. The latter technique is robust against noise, and is well-suited for reconstructing imaging data in the presence of noise.

An improvement to conventional PET imaging is time-of-flight (TOF) PET imaging. TOF-PET further localizes the positron-electron annihilation event along the straight line connecting the two 511 keV gamma ray detection events based on a time difference (or lack thereof) between the two "substantially simultaneous" 511 keV gamma ray detection events. Intuitively, this can be seen as follows. If one detection event is earlier than the other, then the positron-electron annihilation event is likely to have occurred at a point along the connecting line proportionately closer to the earlier detection event. On the other hand, if the two detection events are perfectly simultaneous, then the positron-electron annihilation event is likely to have occurred at a point about midway along the connecting line. In practice, the TOF localization is limited by the temporal resolution of the gamma ray detectors, and can be represented as a TOF "kernel" indicative of a peaked probability density function along the connecting line.

PET image reconstruction by iterative backprojection is computationally intensive. It can take several minutes or longer to reconstruct an image with clinically useful accuracy and resolution for medical or veterinary application. Utilizing TOF localization in the image reconstruction adds further computational complexity and results in still longer iterative reconstruction time. Until the iterative reconstruction is complete, it is generally not known whether the final image will be of satisfactory clinical quality. The subject (e.g., a medical or veterinary patient) is typically kept in the PET scanner until the image reconstruction is complete and the clinician visually verifies that the final reconstructed image is of satisfactory quality, so that additional imaging data can be acquired if the final reconstructed image turns out to be unsatisfactory. This is unpleasant for the subject, and also reduces PET imaging facility throughput.

Another problem with existing PET imaging is gamma ray attenuation by the subject. In general, the regions of accumulated radiopharmaceutical appear as bright regions in the PET image (assuming a positive image) while regions that remain relatively free of the radiopharmaceutical appear as darker regions. Regions with no radiopharmaceutical at all, such as the air surrounding the subject, are completely dark or invisible (neglecting any noise or image artifacts). The dark regions of the subject are not irrelevant, however—they absorb some gamma ray particles and hence reduce the 511 keV counts in a generally spatially varying manner. To compensate, it is known to employ a subject attenuation map during the iterative reconstruction to account for the spatially varying attenuation of 511 keV gamma radiation.

In some existing systems, the PET scanner is combined with a transmission computed tomography (CT) scanner, and the latter is used to acquire radiation attenuation data that can be used to generate the subject attenuation map. Although the radiation used in the CT imaging is typically not at 511 keV, suitable compensation for the difference in radiation energy is known and readily performed.

However, the CT scanner may be unavailable, or may have a smaller field of view (FOV) than the PET scanner. For example, some imaging systems combine a PET scanner with a magnetic resonance (MR) scanner which typically has a substantially smaller FOV than the PET scanner. In such cases, a complete subject attenuation map cannot be generated directly from the CT or MR image.

The following provides new and improved apparatuses and methods which overcome the above-referenced problems and others.

In accordance with one disclosed aspect, a method of processing a positron emission tomography (PET) imaging data set acquired of a subject comprises generating image content independently for each positron-electron annihilation event of a plurality of positron-electron annihilation events of the PET imaging data set based on time of flight (TOF) localization to form a generated image comprising an accumulation of the independently generated image content, wherein the generating operations are performed by a digital processor.

In accordance with another disclosed aspect, a method of processing a positron emission tomography (PET) imaging data set acquired of a subject comprises independently localizing each positron-electron annihilation event of the PET imaging data set based on time of flight (TOF) localization of the positron-electron annihilation event to form a generated image, wherein the independent localizing operations are performed by a digital processor.

In accordance with another disclosed aspect, a method of PET imaging comprises determining a likely location of a detected positron-electron annihilation event based on time of flight (TOF) information, repeating the determining for a plurality of detected positron-electron annihilation events to generate a scout image, and displaying the scout image.

In accordance with another disclosed aspect, a disclosed digital processor is configured to perform a method as set forth in any one of the three immediately preceding paragraphs. In accordance with another disclosed aspect, a disclosed storage medium stores instructions executable by a digital processor to perform a method as set forth in any one of the three immediately preceding paragraphs.

One advantage resides in providing faster iterative PET image reconstruction.

Another advantage resides in providing more accurate PET image reconstruction.

Another advantage resides in providing a more accurate and complete subject attenuation map for use in PET image reconstruction.

Another advantage resides in providing fast generation of scout images for monitoring or planning a clinical PET imaging acquisition.

Further advantages will be apparent to those of ordinary skill in the art upon reading and understand the following detailed description.

FIG. 1 diagrammatically shows a positron emission tomography (PET) imaging system using image content generated event-by-event based on time-of-flight (TOF) information.

Figure 2:
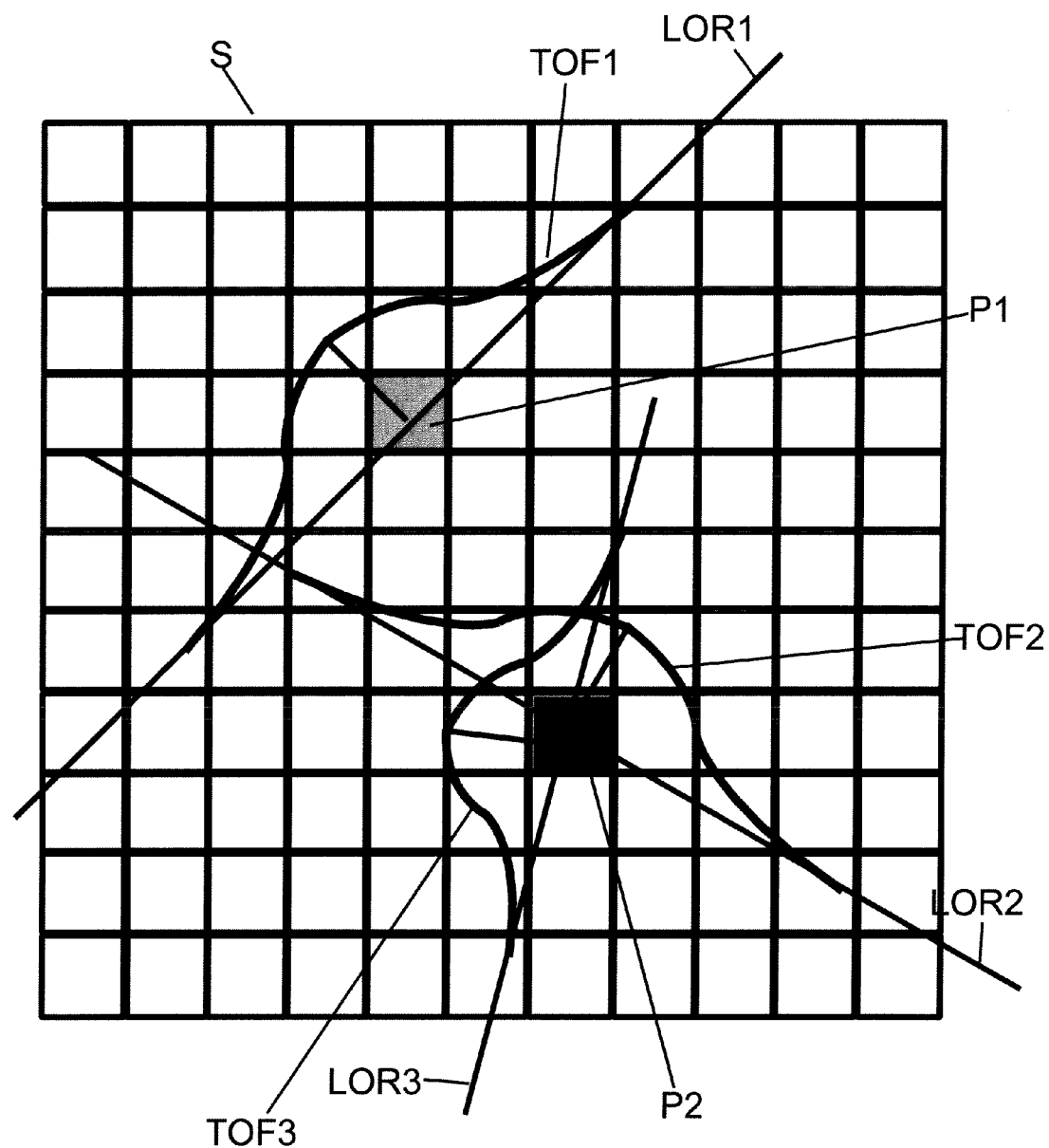
Figure 3:
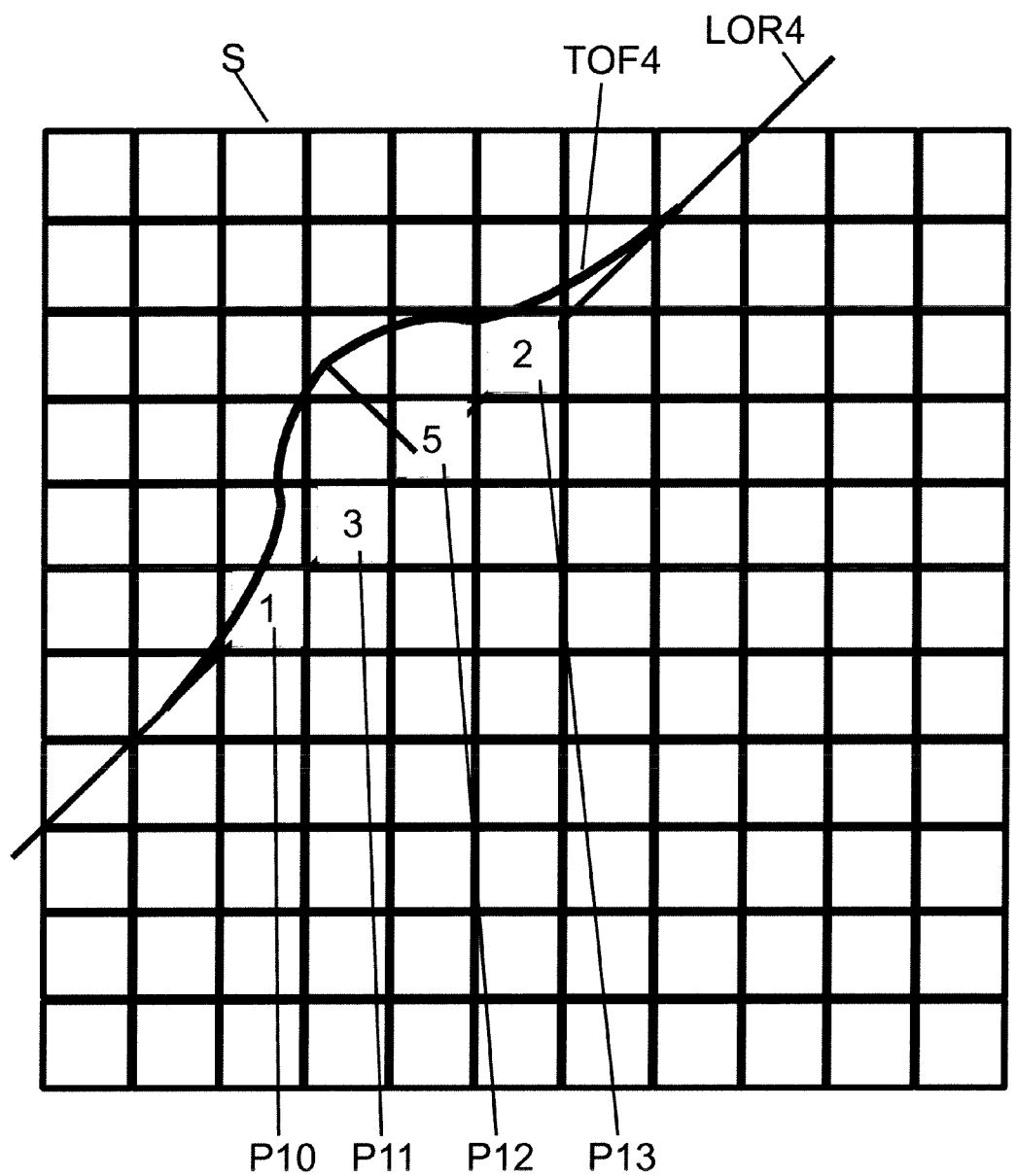

FIGS. 2 and 3 diagrammatically show alternative approaches for generating image content event-by-event based on time-of-flight (TOF) information.

Figure 4:
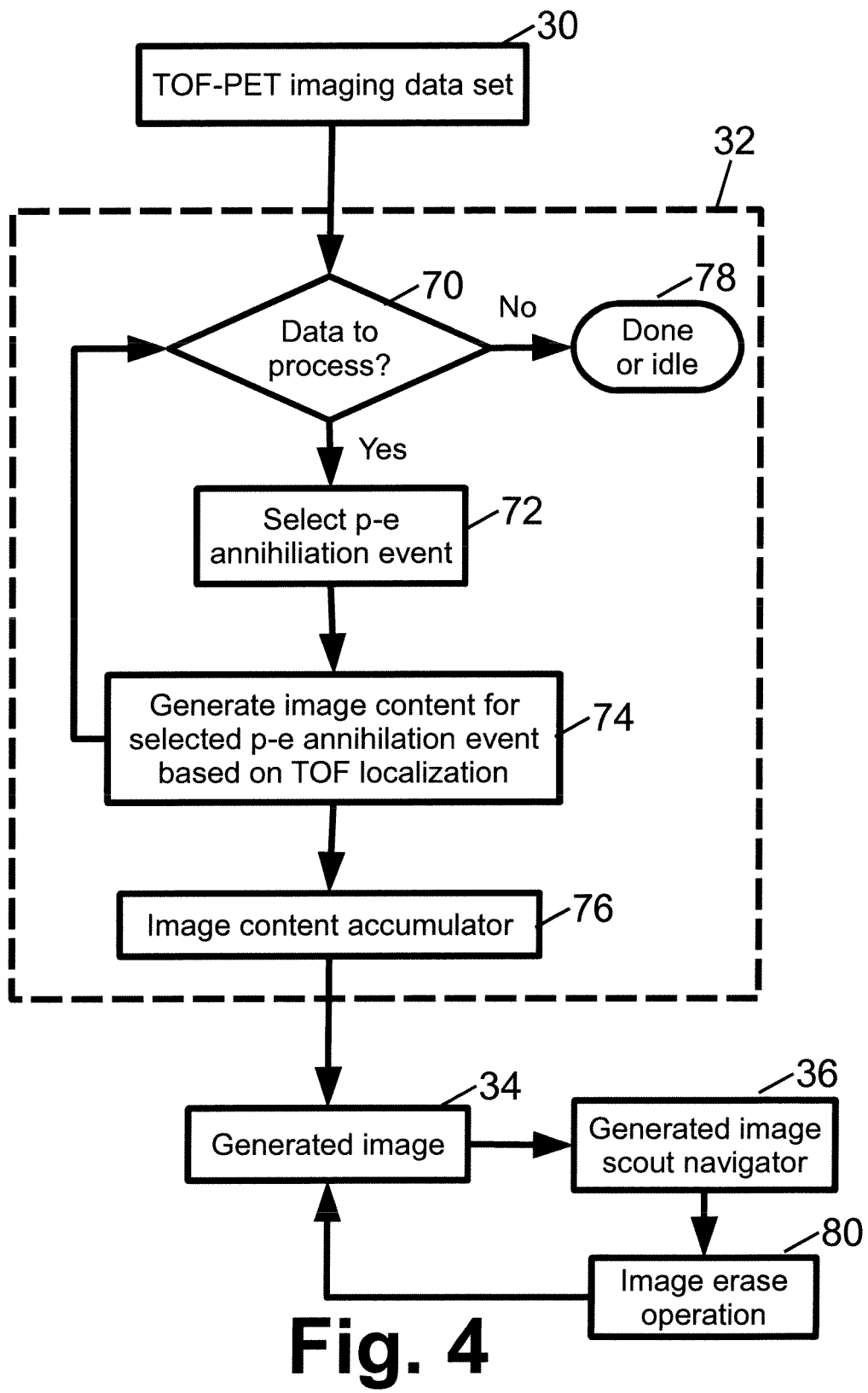
Figure 5:
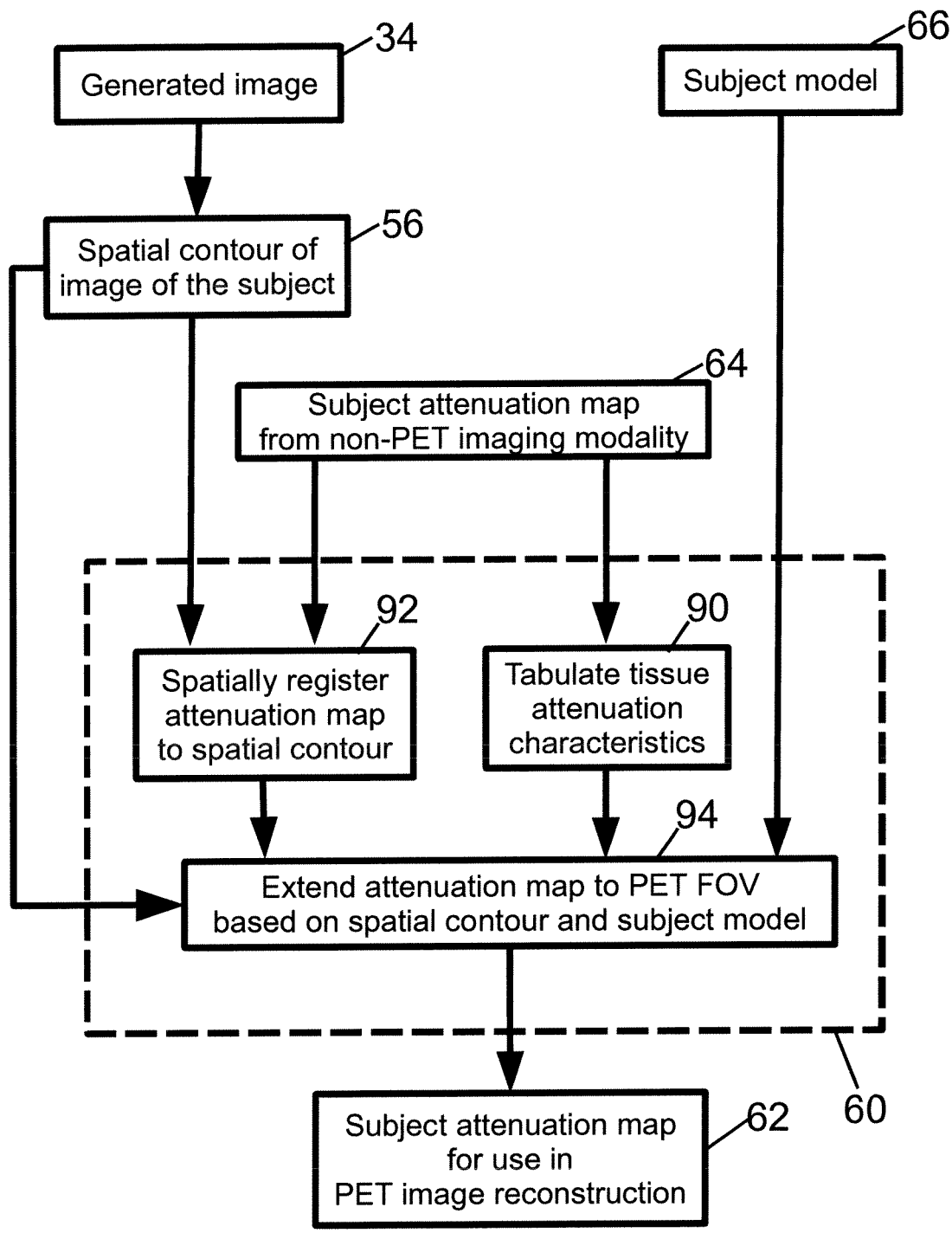

FIGS. 4 and 5 diagrammatically flowchart scout image generation and processing methods suitably performed by the PET imaging system of FIG. 1.

With reference to FIG. 1, an imaging system 10 includes at least time-of-flight (TOF) positron emission tomography (PET) imaging capability. Toward this end, the imaging system 10 includes a subject support 12 for loading an imaging subject into the bore of a gantry 14 which houses one or more rings of PET detectors (not shown) capable of detecting 511 keV gamma rays. Optionally, the imaging system 10 may be capable of performing at least one additional imaging modality other than PET, such as being capable of performing magnetic resonance (MR) imaging or transmission computed tomography (CT) imaging. For example, the gantry 14 may further house a magnet, magnetic field gradient coils, and other components for MR imaging (not shown). Alternatively, the imaging system 10 may include an additional gantry (not shown) with a bore arranged coaxially with the bore of the illustrated gantry 14 so that the subject support 12 can load the subject into either the gantry 14 or into the additional gantry. The additional gantry can house components implementing another imaging modality such as MR or CT. Some suitable imaging systems include, for example, the Gemini™ series of TOF-PET/CT imaging systems that provide TOF-PET and CT imaging capabilities in separate PET and CT gantries with coaxial bores aligned to operate with a common subject support (available from Koninklijke Philips Electronics N.V., Eindhoven, the Netherlands).

The imaging system 10 is controlled by an imaging system controller 16 that interfaces with a human user (for example, a radiologist, medical doctor, veterinarian, or so forth) via an illustrated computer 18 having a display 20 and one or more user input devices 22, or via another suitable user interface. The imaging system controller 16 and user interface 18 can be variously embodied—for example, the imaging system controller 16 may be embodied as a digital processor such as the computer 18 running suitable imaging system control software, or may additionally or alternatively include specialized imaging system control hardware such as one or more dedicated imaging system control digital processors, or so forth.

The illustrated user input device 22 is a keyboard, but more generally one or more user interface devices can be provided, such as for example any combination of a keyboard, mouse, trackball, touch screen, or so forth. The display provides feedback to the user from the imaging system 10, and also displays various acquired images. Although a single display 20 is illustrated, it is contemplated to have two or more displays, such as for example a graphical display for showing acquired images and one or more text-based or lower resolution graphical displays (such as, for example, an LCD screen) for displaying interfacing textual messages, low resolution bar indicators or other low resolution graphical indicators, or so forth.

The imaging system 10 acquires a TOF-PET imaging data set 30 under control of the controller 16 and with optional user control input via the user interface 18. Toward this end, a subject (such as a human imaging subject, an animal veterinary subject, or so forth) is administered a radiopharmaceutical including a radioisotope that emits positrons, and the subject is loaded into the imaging system 10 for PET imaging. The radiopharmaceutical can be administered either before or after loading the subject into the imaging system 10, but should be administered a sufficient time prior to acquiring the TOF-PET imaging data set 30 so that the radiopharmaceutical can accumulate or aggregate in an organ or tissue of interest, or can metabolize via a metabolic pathway of interest, or can otherwise interact with or distribute through the subject in a manner such that the acquired TOF-PET imaging data set 30 contains useful information. For example, in the case of brain imaging sufficient time should be provided to allow the radiopharmaceutical to accumulate in brain tissue of interest.

In the case of a living human or animal subject, the dosage of radiopharmaceutical is preferably limited as dictated by accepted medical standards, veterinary standards, applicable government regulations, facility guidelines, individual medical judgment, or so forth. The dosage is typically relatively low, and as a consequence it typically takes several seconds, tens of seconds, several minutes, or longer in order to detect a sufficient number of positron-electron annihilation events to form a clinically useful image. Further, reconstruction of the TOF-PET imaging data set 30 is computationally intensive and can take several seconds, tens of seconds, several minutes, or longer. As a consequence, the time from initiating image acquisition to display of a reconstructed image can be lengthy.

To address these problems and provide more rapid visual feedback to the user, an image generator 32 is operate to generate image content independently for each positron-electron (p-e) annihilation event based on time of flight localization, so as to form a generated image 34 comprising an accumulation of the independently generated image content. The image generator 32 generates image content for each p-e annihilation event independently, and accordingly can begin generating the image content of the generated image 34 as soon as the first p-e annihilation event is recorded in the memory storing the TOF-PET imaging data set 30. A generated image scout navigator 36 suitably displays the generated image 34 on the display 22 for review by the user. Optionally, the generated image scout navigator 36 can display the image content of the generated image 34 in real time as it is generated by the image generator 32. The effect is to show a gradual "filling in" of the displayed image as progressively more image content is generated. Thus, the user receives nearly instantaneous visual feedback and can watch as the generated image is formed over time as progressively more image content is added as the number of detected e-h annihilation events increases over time.

With brief reference to FIGS. 2 and 3, operation of the image generator 32 is further described. In each of FIG. 2 and FIG. 3, a portion of an image space S is shown diagrammatically, with pixels (or, more generally for three dimensions, voxels) indicated by a grid of boxes. Each box represents a pixel or voxel. Although the illustrated pixels or voxels are square, rectangular or otherwise-shaped pixels or voxels are also contemplated. In FIG. 2, a first illustrative detected e-h annihilation event is defined by two substantially simultaneous 511 keV gamma ray detection events connected by a connecting line or "line of response" denoted in FIG. 2 as LOR1. The time-of-flight information for the first detected e-h annihilation event is represented as a probability density function or kernel diagrammatically depicted in FIG. 2 as a plot respective to the line of response LOR1 and denoted TOF1. In similar fashion, a second illustrative detected e-h annihilation event is indicated by a line-of-response LOR2 and time-of-flight kernel TOF2, and a third illustrative detected e-h annihilation event is indicated by a line-of-response LOR3 and time-of-flight kernel TOF3. In FIG. 3, a single illustrative detected line-of-response LOR4 is depicted with corresponding TOF kernel TOF4.

The TOF kernels TOF1, TOF2, TOF3, TOF4 are peaked distributions whose peak locations along the respective lines-of-response LOR1, LOR2, LOR3, LOR4 are determined by the time difference between the two substantially simultaneous 511 keV gamma ray detection events that define the detected e-h annihilation event. The widths of TOF kernels TOF1, TOF2, TOF3, TOF4 are determined by the temporal resolution of the PET detectors.

In the embodiment of FIG. 2, the image generator 32 operates by increasing a value of an image pixel or voxel of the image space S at the peak of the TOF localization by a selected amount such that the accumulation of value increases forms the generated image 34. The peak of the TOF localization corresponds to the peak of the time-of-flight kernel representation, that is, the most probable location of the detected e-h annihilation event, and can be computed based on the line-of-response and the time difference between the two substantially simultaneous 511 keV gamma ray detection events that define the detected e-h annihilation event. For example, in illustrative FIG. 2 an e-h annihilation event represented by line-of-response LOR1 and TOF kernel TOF1 is processed to generate image content by increasing a value of an image pixel or voxel P1 of the image space S that most probably contains the e-h annihilation event. This is indicated in FIG. 2 by a light shading of pixel or voxel P1. On the other hand, the peaks of the time-of-flight kernels TOF2, TOF3 along respective lines-of-response LOR2, LOR3 happen to coincide at a same pixel or voxel P2. The value of pixel or voxel P2 is therefore increased twice, as indicated by a darker shading of pixel or voxel P2 in FIG. 2. Although not illustrated, it will be appreciated that a third or more e-h annihilation events whose TOF kernels happen to peak at the same pixel or voxel would result in further increases in the value of that pixel or voxel. Cumulatively, the value of the pixel or voxel is indicative of the detected e-h annihilation activity in that pixel or voxel of the space S, and hence the resulting accumulated image content (corresponding to increases in the value of a pixel or voxel value made on a per e-h annihilation event basis) cumulatively define an image of the e-h annihilation activity in the image space S, which in turn is an image representation of the distribution of radiopharmaceutical in the subject.

The resolution of the generated image 34 when generated using the approach of FIG. 2 is limited by the widths of the TOF kernels, that is, by the spatial uncertainty introduced by the finite temporal resolution of the TOF information due to the finite temporal resolution of the PET detectors. The speed of light in a vacuum is $3.00 \times 10^{10}$ cm/sec. If the PET detectors have a temporal resolution of 300 picosecond, then the TOF-limited spatial resolution is on the order of 10 cm. The resolution could be worse than this, for example if there is motion blurring, distance blurring, or so forth. Thus, for PET detectors with 300 picosecond temporal resolution, the generated image 34 when used as a scout image is not of clinical quality—however, if a low concentration of the radiopharmaceutical permeates the entire volume of the subject, then the generated image 34 provides a reasonably accurate outline of the subject, with brighter areas being indicative of areas of more concentrated radiopharmaceutical accumulation. The generated image 34 can have resolution of clinical quality if the PET detectors are of suitably low temporal resolution, e.g. on the order of a few tens of picoseconds, and more preferably on the order of a few picoseconds or shorter.

The approach of forming the generated image 34 described with reference to FIG. 2 does not take into account the width or shape of the TOF kernels (although the spatial resolution may be limited by the width or shape of the TOF kernels).

With reference to FIG. 3, in an alternative approach the image generator 34 generates the image content for each e-h annihilation event by increasing values of image pixels or voxels of the image space S by amounts corresponding to the TOF kernel representing the TOF localization such that the accumulation of value increases forms the generated image. In the example illustrated in FIG. 3, the width of the TOF kernel TOF4 along the line-of-response LOR4 extends over four pixels or voxels denoted P10, P11, P12, P13. The peak of the TOF kernel TOF4 approximately coincides with the pixel or voxel P12 which is assigned the highest value increment of 5. (Note that in FIG. 3 the value increments are indicated numerically, rather than by shading as in FIG. 2). The pixel or voxel P11 is at a lower part of the TOF kernel TOF4 and is assigned a correspondingly lower value increment of 3. The remaining pixels or voxels P10, P13 are assigned respective value increments 1 and 2, respectively, in accordance with the values of the TOF kernel TOF4 coinciding with these pixels or voxels. Thus, the image content corresponding to the e-h annihilation event is an intensity distribution contribution in the approach of FIG. 3, specifically an intensity distribution contribution over the pixels or voxels P10, P11, P12, P13 for the illustrative e-h annihilation event diagrammatically depicted in FIG. 3. As with the approach of FIG. 2, these pixel or voxel value increases are performed on a per e-h annihilation event basis, and the image content comprising these value increases are accumulated to form the generated image 34.

The approach of FIG. 3 more accurately accounts for the spread or uncertainty of the TOF information by modeling the shape and width of the TOF kernel. It is to be appreciated that the TOF kernel width and shape can take into account other sources of resolution degradation besides PET detector temporal resolution, such as distance blurring caused by finite spatial resolution of the PET detectors. Additionally, the TOF kernel width and/or shape can vary across the image space S, for example based on the distance between the peak of the TOF kernel and the proximate PET detector.

With returning reference to FIG. 1, the generated image 34 can be used in various ways to substantially improve the TOF-PET imaging. As already described, the generated image 34 can be used by the generated image scout navigator 36 to provide immediate feedback to the user regarding progress of the PET imaging data acquisition. Depending upon what the user sees in the generated image 34, the user may elect to reposition the subject or make additional or other adjustments in the PET data acquisition. If the scout navigator 36 displays the generated image 34 as it is being generated (that is, as progressively more e-h annihilation events are detected and corresponding image content generated on a per e-h annihilation event basis) then the user may be able to identify certain coarse image problems (such as a large error in subject positioning or a substantial failure of the radiopharmaceutical to accumulate in the organ or tissue of interest, perhaps due to an incorrect choice of radiopharmaceutical) early in the imaging, and can take corrective action or abort the imaging session altogether based on this early information.

The generated image 34 can be used for other purposes. For example, in some embodiments an iterative PET image reconstruction engine 40 performs an iterative reconstruction of the PET imaging data set 30 to produce a reconstructed image 42 that is displayed on the display 20 or otherwise utilized. In general, an iterative reconstruction operates by starting with an initial image, simulating PET imaging data expected to be generated if a subject corresponding to the initial image were to be imaged by a PET scanner, and iteratively adjusts the initial image and repeats the simulation until the simulated PET imaging data substantially comports with the PET imaging data set 30. The speed and accuracy of iterative reconstruction depends to a substantial extent on how close the initial image is to the final reconstructed image. In the embodiment of FIG. 1, the iterative reconstruction uses the generated image 34 as the initial image for the iterative reconstruction. The generated image 34 is expected to be the same as the final reconstructed image except that the generated image 34 is typically of a substantially more coarse resolution due to its being limited by the TOF spatial resolution. Accordingly, the generated image 34 is a suitable choice as the initial image for the iterative reconstruction. Optionally, the initial image may be derived from the generated image 34 by suitable processing such as smoothing, intensity scaling, or other preprocessing (not illustrated).

With continuing reference to FIG. 1, another suitable use of the generated image 34 is in the generation of a subject attenuation map for use in the iterative image reconstruction 40 (as illustrated) or for use in another type of image reconstruction. This application relies upon the radiopharmaceutical being present at a detectable concentration level in the most or all of the portion of the subject disposed in the PET imaging volume. For example, a radiopharmaceutical that targets brain tissue is expected to accumulate in the brain, but a lower concentration of radiopharmaceutical is also expected to be present in the bloodstream and hence is expected to perfuse into skin, muscle, or other tissues in the head and shoulders portion of the subject that is disposed in the PET imaging volume (in the case of brain imaging). As a result, the generated image 34 includes a discernable image of the subject portion disposed in the PET imaging volume as a whole. A subject attenuation map generator 50 applies an image smoother 52 and edge detector 54 or other image segmentation algorithm to identify a spatial contour of the image of the subject 56. Other processing can be employed to identify the spatial contour 56. Moreover, the relatively coarse resolution imposed by the TOF spatial resolution in the case of some PET detectors may provide sufficient smoothing so that the image smoother 52 may be optionally omitted.

A subject attenuation map construction engine 60 constructs a subject attenuation map 62 for use in PET image reconstruction based on the subject spatial contour 56. The attenuation values within the subject spatial contour 56 can be determined from various sources. In some embodiments, a subject attenuation map 64 is available from a non-PET imaging modality. For example, if the imaging system 10 includes a second imaging modality such as MR or CT, then this second imaging modality can be used to acquire the subject attenuation map 64. However, in this case the subject attenuation map 64 may be truncated due to a smaller field of view of the MR or CT imaging modality as compared with the PET imaging modality of the imaging system 10. The subject attenuation map construction engine 60 uses the truncated subject attenuation map 64 as a nucleus, and spatially extends the truncated subject attenuation map 64 to fill the larger PET imaging volume based on a subject model 66, such as a three-dimensional anatomical model of a human subject. Thus, for example, if the subject attenuation map 64 includes regions of muscle tissue having a certain average attenuation value for muscle, this can be spatially extended to other regions outside the truncated subject attenuation map 64 which are expected to also comprise muscle tissue based on the subject model 66.

As another alternative, the subject attenuation map 64 may be acquired using a different imaging system, or may be computed from the subject model 66 based on known 511 keV attenuation values for various tissues. In such cases, however, the subject attenuation map 64 may be out of spatial registration with the subject disposed on the subject support 12 for PET imaging. For example, the subject attenuation map 64 may be for the subject in a different position, or may be for a similar but different subject of different size, or so forth. In such cases, the subject spatial contour 56 can be used as a spatial reference, and the subject attenuation map 64 is suitably spatially registered with the subject spatial contour 56 by a selected rigid or nonrigid spatial registration algorithm.

The resulting subject attenuation map 62 is suitably used by the iterative PET image reconstruction engine 40 to take into account absorption of 511 keV gamma rays by tissues of the subject in performing the iterative reconstruction. It should be noted that the generated image 34 may be used: (1) both in constructing the subject attenuation map 62 and as the initial image for the reconstruction 40 (as shown); or (2) the generated image 34 may be used only in constructing the subject attenuation map 62 but not as the initial image for an iterative reconstruction (for example, if a non-iterative image reconstruction algorithm is employed which does not utilize an initial image); or (3) the generated image 34 may be used only as the initial image for the reconstruction 40 (for example, if a satisfactory subject attenuation map coextensive with the PET imaging volume is already available from CT imaging or another source).

With reference to FIGS. 4 and 5, these illustrative applications are diagrammatically shown in a flowchart format. As shown in FIG. 4, the TOF-PET imaging data set is processed by the image generator 32 to form the generated image 34. The image generator 32 operates independently on each acquired positron-electron annihilation event in order to accumulate image content. In a suitable process, a decision operation 70 detects whether there are TOF-PET imaging data to process. If so, a positron-electron annihilation event is selected for processing in operation 72, and image content is generated for the selected positron-electron annihilation event in an operation 74 based on the line-of-response and the TOF localization. The operation 74 can employ the approach diagrammatically shown in FIG. 2 in which a value of an image pixel or voxel P1, P2 of the image space S at the peak of the TOF localization is increased by a selected amount. Alternatively, the operation 74 can employ the approach diagrammatically shown in FIG. 3 in which values of image pixels or voxels P10, P11, P12, P13 of the image space S are increased by amounts corresponding to a TOF kernel TOF4 representing the TOF localization. In either case, an image content accumulator 76 accumulates the value increase or increases to contribute to the generated image 34. Processing returns to the decision operation 70 to process the next available acquired positron-electron annihilation event. If no unprocessed events are available, operation of the image generator 32 ceases or goes into an idle mode in operation 78. For example, if the image generator 32 is applied after the PET imaging data acquisition is complete, then the operation 78 is suitably a stop operation. On the other hand, if the image generator 32 is applied continuously during the PET imaging data acquisition so as to continually add image content to the generated image 34 in substantially real time, then the operation 78 is suitably an idle operation in which the image generator 32 waits until the next positron-electron annihilation event datum is acquired.

The resulting generated image 34 suitably serves as a scout image that can be displayed, rendered, or otherwise visualized by the generated image scout navigator 36. In the case of substantially real-time operation the scout image appears to be gradually filled in as image content corresponding to newly acquired positron-electron annihilation events are added by the image generator 32. In this case, the user suitably has the option of issuing an image erase operation 80 via the scout navigator 36 to erase the generated image 34 in order to begin accumulation of image content comprising a new generated image. For example, the user may select the image erase operation 80 when the subject is repositioned such that the scout image no longer corresponds to the current subject position.

FIG. 5 diagrammatically illustrates operation of an embodiment of the subject attenuation map construction engine 60 of FIG. 1. In this embodiment, the truncated subject attenuation map 64 is received from another imaging modality such as CT or MR, and the subject attenuation map construction engine 60 spatially extends the truncated map to fill the PET field-of-view (FOV) based on the spatial contour 56 of the image subject which is extracted from the generated scout image 34. The spatial contour 56 may, for example, be generated by operation of the image smoother 52 and edge detector 54 illustrated in FIG. 1 as already described. If needed, the subject attenuation map construction engine 60 uses the truncated subject attenuation map 64 as a nucleus, and spatially extends the truncated subject attenuation map 64 to fill the larger PET imaging FOV based on the subject model 66. Toward this end, the attenuation map 64 is compared with the subject model 66 to identify and tabulate attenuation characteristics for the various tissues in an operation 90. If appropriate, the attenuation map 64 is also spatially registered with the spatial contour 56 in an operation 92. The attenuation map 64 (after optional spatial registration 92) is then extended to the PET FOV in an operation 94 based on the spatial contour 56 which identifies the extent of the subject outside of the truncated FOV of the attenuation map 64 and based on identification of tissue or tissues in the extended FOV determined based on the subject model 66 and the tabulated attenuation characteristics for those tissues as determined by the operation 90. For example, if the attenuation map 64 includes an elongate bone surrounded by muscle that is truncated at the boundary of the attenuation map 64, the spatial contour 56 and subject model 66 can be used to determine the extended range of bone tissue and of muscle tissue, respectively, spanning the PET FOV, and the attenuation map extended using respective bone and muscle tissue attenuation values as determined in the operation 90. The result is the subject attenuation map 62 for use in PET image reconstruction.

The illustrative applications of the generated image 34, including use as a scout image, use in constructing a subject attenuation map, and use as an initial image for iterative reconstruction, as described with reference to FIG. 1, are merely illustrative examples. Other applications are contemplated for the generated image 34. For example, if the PET detectors provide sufficient TOF spatial resolution for a given clinical application, the generated image 34 is contemplated for use as the clinical image employed in medical or veterinary diagnosis or other clinical applications. Similarly, it is contemplated for the generated image 34 to be used for certain medical screening procedures where the TOF-limited spatial resolution of the generated image 34 may be sufficient to perform a threshold-based screening. For example, if a radiopharmaceutical is known to accumulate in malignant tumours in a given tissue but not in the healthy tissue, then screening based on thresholding integrated PET image intensity for regions of the given tissue ratioed respective to integrated PET image intensity for the body as a whole may be sufficient to provide screening for certain types of cancer in the given tissue. Yet another contemplated application of the generated image 34 is as a validation check for complex iterative reconstruction algorithms that may have a tendency to converge to nonphysical solutions. By comparing the final iteratively reconstructed image with the generated image 34 (which is likely to be physically accurate albeit at coarse spatial resolution) a nonphysical iterative solution can be detected and discarded.

Yet another contemplated application is detection of subject motion in approximately real time. As already noted, the generated image scout navigator 36 optionally displays the generated image as the image content is generated over the image acquisition. This continuously updated scout image represents a probability distribution for e-h annihilation events. As the PET data acquisition progresses, the continuously updated scout image is expected to become a progressively more accurate probability distribution. Accordingly, PET imaging data acquired in any given interval $[t_o, t_o+\Delta t]$ (where $\Delta t$ is a relatively short time interval but long enough to include a statistically significant count of e-h annihilation event detections) can be expected to conform with the probability distribution of the generated image with progressively greater accuracy as time $t_o$ progresses forward through the PET imaging data acquisition.

If, however, this conformance with the generated image is observed to abruptly decrease at a certain value of $t_o$, this may be indicative of subject motion (or perhaps some other problem, such as an equipment failure) at about the time of the abrupt decrease. Remedial action can then be taken (for example, discarding data subsequent to the motion if it occurs late enough in the acquisition session, or discarding the earlier data if the motion occurs early in the acquisition session and extending the time of acquisition accordingly). Moreover, for list mode PET data in which the absolute time of each e-h annihilation event is stored, such analysis for detecting subject motion can be performed retrospectively on the stored PET imaging data set.

The illustrative processing components 16, 32, 36, 40, 52, 54, 60 diagrammatically depicted in FIG. 1 as examples may be variously embodied by one or more digital processors. In some embodiments, the illustrated computer 18 is suitably programmed to define the digital processor embodying one, some, or all of the illustrative processing components 16, 32, 36, 40, 52, 54, 60. The scout navigator 36 is suitably embodied by the digital processor of the computer 18 along with the display 20 for displaying the generated image 34 for user navigation purposes. Additionally or alternatively, one, some, or all of the illustrative processing components 16, 32, 36, 40, 52, 54, 60 may be embodied by one or more digital processors (not shown) that are dedicated to performing the disclosed operations implemented by these illustrative processing components 16, 32, 36, 40, 52, 54, 60.

Still further, the disclosed operations implemented by one, some, or all of the illustrative processing components 16, 32, 36, 40, 52, 54, 60 may be embodied by storage medium storing instructions executable by a digital processor (such as the illustrative computer 18) to perform the disclosed operations. Such a storage medium may, for example, comprise one or more of the following storage media: a hard disk drive or other magnetic storage medium or media; an optical disk or other optical storage medium or media; a random access memory (RAM), read-only memory (ROM), flash memory, or other electronic storage medium or media; various combinations thereof; or so forth.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

Having thus described the preferred embodiments, the invention is now claimed to be:

1. A method of processing a positron emission tomography (PET) imaging data set acquired of a subject, the method comprising:
   generating image content independently for each positron-electron annihilation event of a plurality of positron-electron annihilation events of the PET imaging data set based on time-of-flight (TOF) localization to form a generated image comprising an accumulation of the independently generated image content, wherein the generating comprises increasing values of image pixels or voxels of an image space by amounts corresponding to a TOF kernel representing the TOF localization such that the accumulation of value increases forms the generated image;
   wherein the generating operations are performed by a digital processor.

2. The method as set forth in claim 1, further comprising:
   delineating a spatial contour of an image of the subject in the PET imaging data set based on the generated image.

3. The method as set forth in claim 2, wherein the delineating comprises:
   applying an edge detector or image segmentation algorithm to the generated image.

4. The method as set forth in claim 3, wherein the delineating further comprises:
   smoothing the generated image prior to applying the edge detector or image segmentation algorithm.

5. The method as set forth in claim 2, further comprising:
   constructing a subject attenuation map for use in PET image reconstruction based in part on the spatial contour.

6. A non-transitory storage medium storing instructions executable by a digital processor to perform a method comprising:
   generating image content independently for each positron-electron annihilation event of a plurality of positron-electron annihilation events of the PET imaging data set based on time-of-flight (TOF) localization to form a generated image comprising an accumulation of the independently generated image content;
   delineating a spatial contour of an image of the subject in the PET imaging data set based on the generated image;
   constructing a subject attenuation map for use in PET image reconstruction based in part on the spatial contour; and
   reconstructing the PET imaging data set to produce a reconstructed image using the constructed subject attenuation map.

7. The non-transitory storage medium as set forth in claim 6, wherein the generating comprises:
   increasing a value of an image pixel or voxel of an image space at a peak of the TOF localization by a selected amount such that the accumulation of value increases forms the generated image.

8. The non-transitory storage medium as set forth in claim 6, wherein the constructing comprises:
   spatially extending a truncated subject attenuation map based on the spatial contour to construct the subject attenuation map for use in PET image reconstruction.

9. The non-transitory storage medium as set forth in claim 6, wherein the constructing comprises:
   spatially registering a subject attenuation map with the spatial contour to construct the subject attenuation map for use in PET image reconstruction.

10. A method of processing a positron emission tomography (PET) imaging data set acquired of a subject, the method comprising:
    independently localizing each positron-electron annihilation event of the PET imaging data set based on time-of-flight (TOF) localization of the positron-electron annihilation event to form a generated image; and
    performing an iterative reconstruction of the PET imaging data set to produce a reconstructed image, the iterative reconstruction operating by starting with an initial image that is the generated image or that is derived from the generated image, simulating PET imaging data for the initial image, and iteratively adjusting the initial image and repeating the simulation to match the simulated PET imaging data with the PET imaging data set;
    wherein the independent localizing and iterative reconstruction operations are performed by a digital processor.

11. The method as set forth in claim 10, wherein the independent localizing comprises:
    independently localizing each positron-electron annihilation event of the PET imaging data to a most probable voxel or pixel based on the time-of-flight (TOF) localization of the positron-electron annihilation event.

12. The method as set forth in claim 10, wherein the independent localizing comprises:
    defining an intensity distribution contribution to the generated image corresponding to the time-of-flight (TOF) localization of the positron-electron annihilation event.

13. The method as set forth in claim 10, further comprising:
    displaying the generated image.

14. The method as set forth in claim 10, further comprising:
    delineating a spatial contour of an image of the subject in the PET imaging data set based on the generated image.

15. The method as set forth in claim 14, further comprising:
    constructing a subject attenuation map for use in PET image reconstruction based at least in part on the spatial contour.

16. A method of positron emission tomography (PET) imaging comprising:
- determining a likely location of a detected positron-electron annihilation event based on time-of-flight (TOF) information;
- repeating the determining for a plurality of detected positron-electron annihilation events to generate a scout image; and
- generating an attenuation map based on the scout image;
- wherein the determining, repeating, and generating operations are performed by a digital processor.

17. The method as set forth in claim 16, further comprising:
- performing, by the digital processor, an iterative reconstruction of the plurality of detected positron-electron annihilation events using the scout image as an initial image to generate a reconstructed image.

18. The PET imaging method as set forth in claim 16, further comprising:
- performing medical screening based on the scout image.

19. The PET imaging method as set forth in claim 16, further comprising:
- determining a subject contour based on the scout image, the determining being performed by the digital processor.

20. A method of positron emission tomography (PET) imaging comprising:
- determining a likely location of a detected positron-electron annihilation event based on time-of-flight (TOF) information;
- repeating the determining for a plurality of detected positron-electron annihilation events to generate a scout image;
- wherein the determining and repeating are performed during detection of the detected positron-electron annihilation events and the method further: comprises identifying subject motion based on inconsistency of more recently detected positron-electron annihilation events with the scout image;
- wherein the determining, repeating, and identifying operations are performed by a digital processor.

* * * * *